US011969650B2

(12) United States Patent
Tokubo

(10) Patent No.: US 11,969,650 B2
(45) Date of Patent: Apr. 30, 2024

(54) FEATURE SIMILARITY SCORING OF PHYSICAL ENVIRONMENT FOR AUGMENTED REALITY GAMEPLAY

(71) Applicant: Sony Interactive Entertainment Inc., Tokyo (JP)

(72) Inventor: Todd Tokubo, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 350 days.

(21) Appl. No.: 17/530,329

(22) Filed: Nov. 18, 2021

(65) Prior Publication Data

US 2023/0149809 A1 May 18, 2023

(51) Int. Cl.
| A63F 13/65 | (2014.01) |
| A63F 13/46 | (2014.01) |
| A63F 13/56 | (2014.01) |
| G06N 20/00 | (2019.01) |

(52) U.S. Cl.
CPC .............. *A63F 13/46* (2014.09); *A63F 13/56* (2014.09); *A63F 13/65* (2014.09); *G06N 20/00* (2019.01); *A63F 2300/8082* (2013.01)

(58) Field of Classification Search
CPC .......................... A63F 13/65; A63F 2300/0082
See application file for complete search history.

(56) References Cited

U.S. PATENT DOCUMENTS

| 8,231,465 | B2 * | 7/2012 | Yee | .................. | A63F 13/426 |
| | | | | | 463/31 |
| 9,539,498 | B1 * | 1/2017 | Hanke | .................... | A63F 13/00 |
| 2017/0148339 | A1 * | 5/2017 | Van Curen | ............ | A63F 13/211 |
| 2017/0216728 | A1 * | 8/2017 | Logan | .................... | A63F 13/213 |
| 2018/0322706 | A1 | 11/2018 | Drouin et al. | | |
| 2019/0392645 | A1 | 12/2019 | Drouin et al. | | |
| 2020/0357187 | A1 | 11/2020 | Drouin et al. | | |
| 2021/0082191 | A1 | 3/2021 | Tajik | | |
| 2021/0252384 | A1 * | 8/2021 | Li | ........................... | A63F 13/35 |

FOREIGN PATENT DOCUMENTS

WO     2019161312 A1     8/2019

OTHER PUBLICATIONS

PCT/US2022/048274, Notification of Transmittal of the International Search Report and the Written Opinion of the International Searching Authority, or the Declaration, PCT/ISA/220, and the International Search Report, PCT/ISA/210, dated Feb. 23, 2023.

* cited by examiner

*Primary Examiner* — Jay Trent Liddle
(74) *Attorney, Agent, or Firm* — Penilla IP, APC

(57) ABSTRACT

Methods and systems are provided for processing feature similarity for a real-world space used for augmented reality (AR) gameplay is disclosed. The method includes receiving captured sensor data from the real-world space used by a user for said AR gameplay of a game. The sensor data provides data to identify characteristics of physical objects in the real-world space. The method includes generating a user space score using the characteristics of the physical objects identified in the real-world space. The method includes comparing the user space score to a game space score that is predefined for the game. The comparing is used to produce a fit handicap for the AR gameplay of the game in the real-world space by the user. Adjustments to gameplay parameters may be made to compensate or adjust the fit handicap.

20 Claims, 6 Drawing Sheets

(420) WALLS:

SURFACE MATERIALS:

| TYPE | 440 THRESHOLD SATISFIED? | 442 NUMERIC COUNT |
|---|---|---|
| • ROUGH | Y | 2 |
| • BRICK | N | 0 |
| • COVERINGS | Y | 3 |
| • SMOOTH | Y | 16 |
| • WINDOWS | Y | 2 |
| ⋮ | ⋮ | ⋮ |

(422) FLOORS:

SURFACE MATERIALS:

| TYPE | 440 THRESHOLD SATISFIED? | 442 NUMERIC COUNT |
|---|---|---|
| BRICK | N | 0 |
| CARPET | Y | 2 |
| RUGS | Y | 2 |
| TILE | N | 0 |
| CONCRETE | Y | 6 |
| ⋮ | ⋮ | ⋮ |

(424) FURNITURE:

SURFACE MATERIALS:

| TYPE | 440 THRESHOLD SATISFIED? | 442 NUMERIC COUNT |
|---|---|---|
| COUCH | N | 0 |
| CHAIRS | Y | 2 |
| LAMPS | Y | 1 |
| TABLE | Y | 1 |
| RUGS | Y | 2 |
| TV | Y | 1 |

(426) OTHER OBJECTS, PEOPLE, PETS, ETC.
⋮

450 — USER SPACE SCORE

FIG. 5

FEATURE SIMILARITY SCORING OF PHYSICAL ENVIRONMENT FOR AUGMENTED REALITY GAMEPLAY

BACKGROUND

1. Field of the Disclosure

The present disclosure relates generally to using feature similarity in a real-world space to enable adjustments to gameplay parameters in AR gaming and/or to adjust to the uniqueness of a gaming space of a user.

2. Description of the Related Art

Augmented reality (AR) technology has seen unprecedented growth over the years and is expected to continue growing at a compound annual growth rate. AR technology is an interactive three-dimensional (3D) experience that combines a view of the real-world with computer-generated elements (e.g., virtual objects) in real-time. In AR simulations, the real-world is infused with virtual objects and provides an interactive experience. With the rise in popularity of AR technology, various industries have implemented AR technology to enhance the user experience. Some of the industries include, for example, the video game industry, entertainment, and social media.

For example, a growing trend in the video game industry is to improve the gaming experiencing of users by enhancing the reality of the experience. However, since an AR experience necessarily relies on what is present in the real-world, the AR experience for one user will vary from another user, even if the same media is used for the AR experience.

It is in this context that implementations of the disclosure arise.

SUMMARY

Implementations for the present disclosure include methods and system for generating and using a feature similarity score for gameplay in an AR environment. In one embodiment, a method includes scanning the environment with multiple sensors (visual, audio, etc.) to capture key aspects of a playing environment. In one configuration, a scoring method is used to judge how well fit the real-world space of a user would be verses an optimized type of game play. In one example, the scoring can take into consideration a number of clean walls, an amount of open floor space, a shape of an object or obstacle, a size or volume of an object or obstacle, an amount of surfaces that are smooth or rough, the number of windows, type of furniture, the presence of other people or players, etc. This scoring for the user's real-world space would produce a user space score. The user's space score may be compared to a game space score that is predefined by a developer of the game, e.g., representing an optimized type of environment for playing the VR game.

With the user space score being known, it is possible to dynamically adjust gameplay parameters to reduce or eliminate a fit handicap of the user. In some cases, the gameplay are adjusted to normalize game play (e.g., how types of enemies are spawned, how scoring is done, difficulty of actions or tasks, etc.) verses a population of other game players and what the game developers intended as a ground truth. In one embodiment, capturing and calculating the user's space score allows for the uniqueness of an environment to be anticipated and accommodated for in AR game development.

In one embodiment, a method for processing feature similarity for a real-world space used for augmented reality (AR) gameplay is disclosed. The method includes receiving captured sensor data from the real-world space used by a user for said AR gameplay of a game. The sensor data provides data to identify characteristics of physical objects in the real-world space. The method includes generating a user space score using the characteristics of the physical objects identified in the real-world space. The method includes comparing the user space score to a game space score that is predefined for the game. The comparing is used to produce a fit handicap for the AR gameplay of the game in the real-world space by the user.

In another embodiment, a method for processing feature similarity for a real-world space used for augmented reality (AR) gameplay is disclosed. The method includes receiving captured sensor data from the real-world space used by a user for said AR gameplay of a game. The sensor data provides data to identify characteristics of physical objects in the real-world space. The method includes generating a user space score using the characteristics of the physical objects identified in the real-world space. The method includes generating a fit handicap for the AR gameplay of the game in the real-world space by the user. The method includes adjusting gameplay parameters of the game for the user. The adjusting causing changes to difficulty settings for the game to compensate for the fit handicap.

In some embodiments, the fit handicap is based on a comparison of the user space score to a game space score that defines an optimized baseline for a type of environment to be used for playing the game during said AR gameplay.

In some embodiments, the method further includes adjusting scoring thresholds for the game. The adjusting of scoring thresholds lowers a skill requirement for actions in the game to be awarded scoring in the game.

In some embodiments, the user space score includes a numeric count of each type of surface material within the zone of interactivity.

In some embodiments, each numeric count is scored upon meeting to threshold size for said type of surface material.

In some embodiments, the sensor data is captured by one or more of a camera, a microphone, or an ultrasonic sensor, and the sensor data, the sensor data is processed to identify feature sets that are labeled by a machine learning process, the machine learning process is trained to identify the characteristics of the physical objects in the real-world space.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 5 illustrates examples of different types of objects present in a real-world space, and attributes and characteristics identified in the real-world space responsive to the scanning, in accordance with one embodiment.

DETAILED DESCRIPTION

The following implementations of the present disclosure provide methods, systems, and devices for generating and using a feature similarity score for gameplay in an AR environment. A feature similarity score is generated in the form of a game space score associated with a zone of interaction of a user in a real-world space when playing a game using augmented reality (AR) glasses. As used herein, the AR glasses are able to process both AR and virtual reality. For example, AR allows for virtual objects to be placed in and around a real-world space, whereas a VR environment is fully generated by a computing system. The computing system, in accordance with one embodiment, maybe be associated with the AR glasses. The AR glasses may have a processor that executed program instructions for rendering AR objects and/or VR content. In one embodiment, the AR glasses have wireless communication to enable direct communication to a server over the Internet. In other embodiments, the AR glasses may communicate locally to a game console or local computer, which in turn communicates to a server over the Internet.

In one embodiment, a method includes scanning the environment with multiple sensors (visual, audio, etc.) to capture key aspects of a playing environment. The multiple sensors will vary from cameras, microphones, ultrasonic sensors, light sensors, motion sensors, inertial sensors, and/or combinations thereof. In some embodiments, sensor fusion is used to collect data captured from the various sensors when scanning a room, e.g., the zone of interactivity. In one configuration, a scoring method is used to judge how well fit the real-world space of a user would be verses an optimized type of game play. In one example, the scoring can take into consideration a number of clean walls, an amount of open floor space, a shape of an object or obstacle, a size or volume of an object or obstacle, an amount of surfaces that are smooth or rough, the number of windows, type of furniture, the presence of other people or players, etc. This scoring for the user's real-world space would produce a user space score. The user's space score may be compared to a game space score that is predefined by a developer of the game, e.g., representing an optimized type of environment for playing the VR game.

With the user space score being known, it is possible to dynamically adjust gameplay parameters to reduce or eliminate a fit handicap of the user. In some cases, the gameplay are adjusted to normalize game play (e.g., how types of enemies are spawned, how scoring is done, difficulty of actions or tasks, etc.) verses a population of other game players and what the game developers intended as a ground truth. In one embodiment, capturing and calculating the user's space score allows for the uniqueness of an environment to be anticipated and accommodated for in AR game development.

Figure 1:
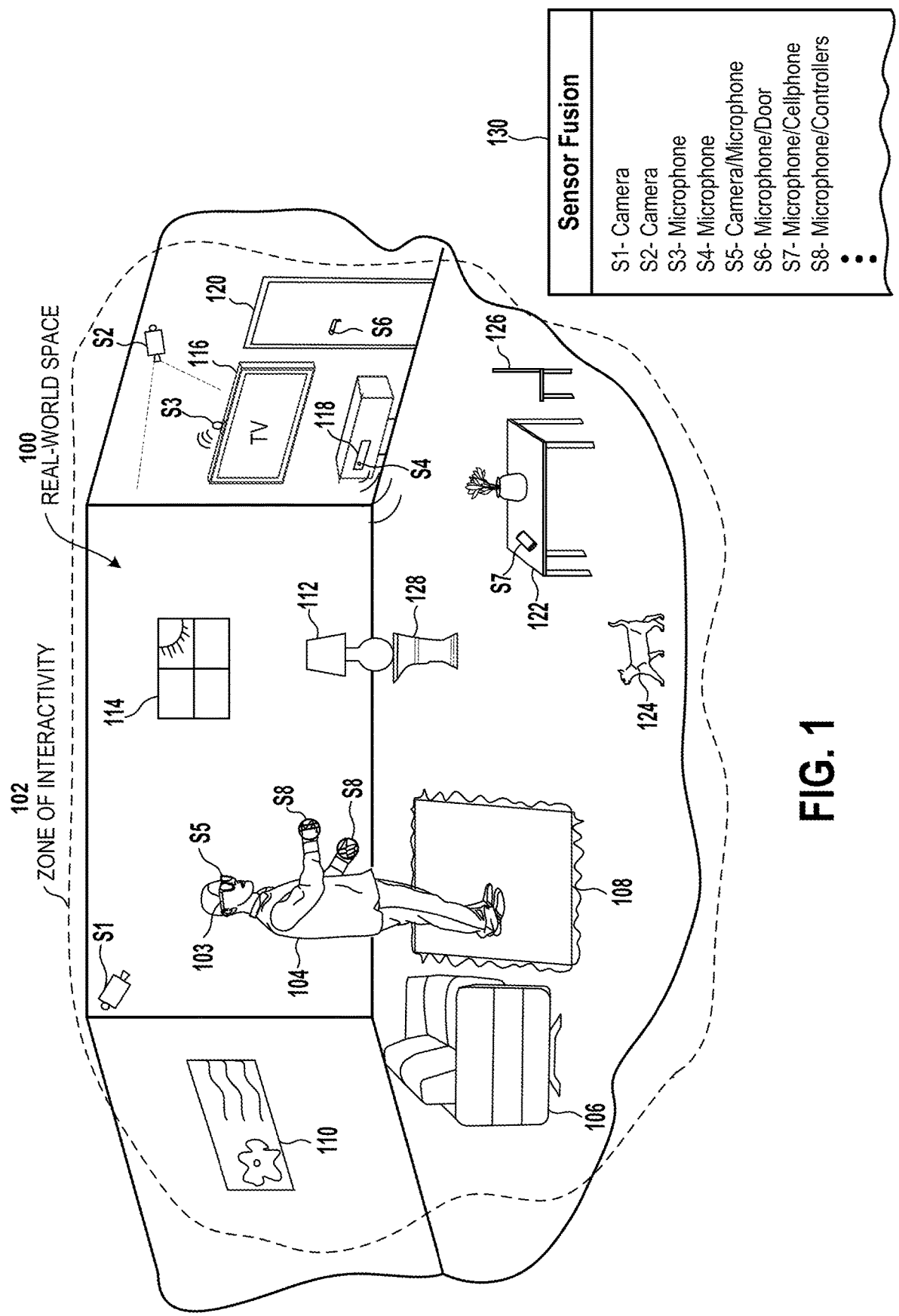
FIG. 1 illustrates an example of a real-world space where a user is playing a game, in accordance with one embodiment.

FIG. 1 illustrates an example of a real-world space 100 where a user 104 is playing a game. In one embodiment, the user is playing an augmented reality game using AR glasses 103 in a zone of interactivity 102. Although the user's location may be more expansive, the zone of interactivity 102 is the area proximate to the user, e.g., where the user is located and playing a game. Generally speaking, the real-world space 100 may not include other rooms in the house or location, as those other areas may not offer the performance of the AR glasses 103 when playing an AR game. The AR glasses 103, for example, may be projecting virtual objects upon or near real-world objects in the zone of interactivity.

The performance of the projecting, e.g., how the virtual object is perceived in the real-world space 100 may be affected if there is not enough surfaces or things in which the AR objects can be projected or moved in accordance with a game. By way of example, if there are too many windows, the light outside ambient light may affect the performance of the projected AR objects. Similarly, if the space has too many cluttered walls or spaces, the AR objects may not have sufficient room for projection and/or movement. In some case, if the floors are too reflective or too rough, the projection of AR content may also be less than optimal.

When a developer of the AR game produces the game, the developer must make some baseline assumptions of how the real-world space will look and/or have a minimum level of spaces for placing, moving or interacting AR content that is projected and tracked. If the space lacks these baseline assumptions for the features needed for the AR game, then the game performance of the user will suffer during gameplay. In accordance with one embodiment, a process is described that enables scanning of the zone of interactivity 102 in order to generate a game space score. The game space score of the user's real-world space 100 is then compared to a game space score that is predefined for the game by the developer. The game space score, for example, may define the baseline requirements to have optimal game play experiences using AR or VR.

In one embodiment, the scanning can be done using one or more sensors. The sensors can vary from those that capture audio, capture video, capture motion, capture ultrasonic waves, capture temperature, capture humidity, capture inertial data, etc. The sensors can be part of existing devices in a the real-world space, e.g., one or more cameras S1, S2, microphone S3, microphone S4, camera and microphone S5 on the AR glasses 103, microphone S6 that may be part of a door or door bell, microphone S7 on a cellphone, microphone S8 integrated in one or more controllers that may be held by the user 104, etc.

These sensors, in one embodiment, may be configured to capture characteristics of the zone of interactivity 102, and identify the types of objects and/or surface materials. In the illustrated example, the user 104 is standing on a rug 108. A chair 106 and chair 126 are identified in the space. A picture 110 hangs on the wall. A window 114 is identified on one of the walls. A television 116 is hanging on another wall. A door 120 is located next to the television 116. A game console 118 is located under the television 116. A table 112 is present and a cellphone S7 is placed on the table. A dog 124 is captured moving about the zone of interactivity 102. A lamp 112 sits on a small table 128 in the middle of the room. In one embodiment, sensor fusion 130 represents the capture of environmental data from a real-world space in order to identify objects, surfaces, materials, and other environmental features.

In one embodiment, machine learning is utilized to process inputs received from the various sensors. A machine learning algorithm uses a model that is trained to identify objects that are likely present in a zone of interactivity. For example, raw sensor data is first processed by the machine learning system to identify feature data from within the captured sensor data. The feature data is then processed using a labeling algorithm. The labeling algorithm is configured to assign meaning to the feature data in order to classify the labeled feature data. Over time, based on training, feature data that is labeled is properly classified to improve the machine learning model. Once the machine learning model is trained, it can be used to process sensor data captured of a zone of interactivity.

The processing of the sensor data using the machine learning model, it is possible to identify what the real-world features are in the real-world space. For instance, the sensor data can be used to identify the lamp 112, the rug 108, the dog 124, the window 114, the TV 116, and other objects that may move in or out of the zone of interactivity. As will be discussed in more detail below, by identifying features present in the zone of interactivity and properties of those features, it is possible to generate a game space score for the zone of interactivity.

Figure 2:
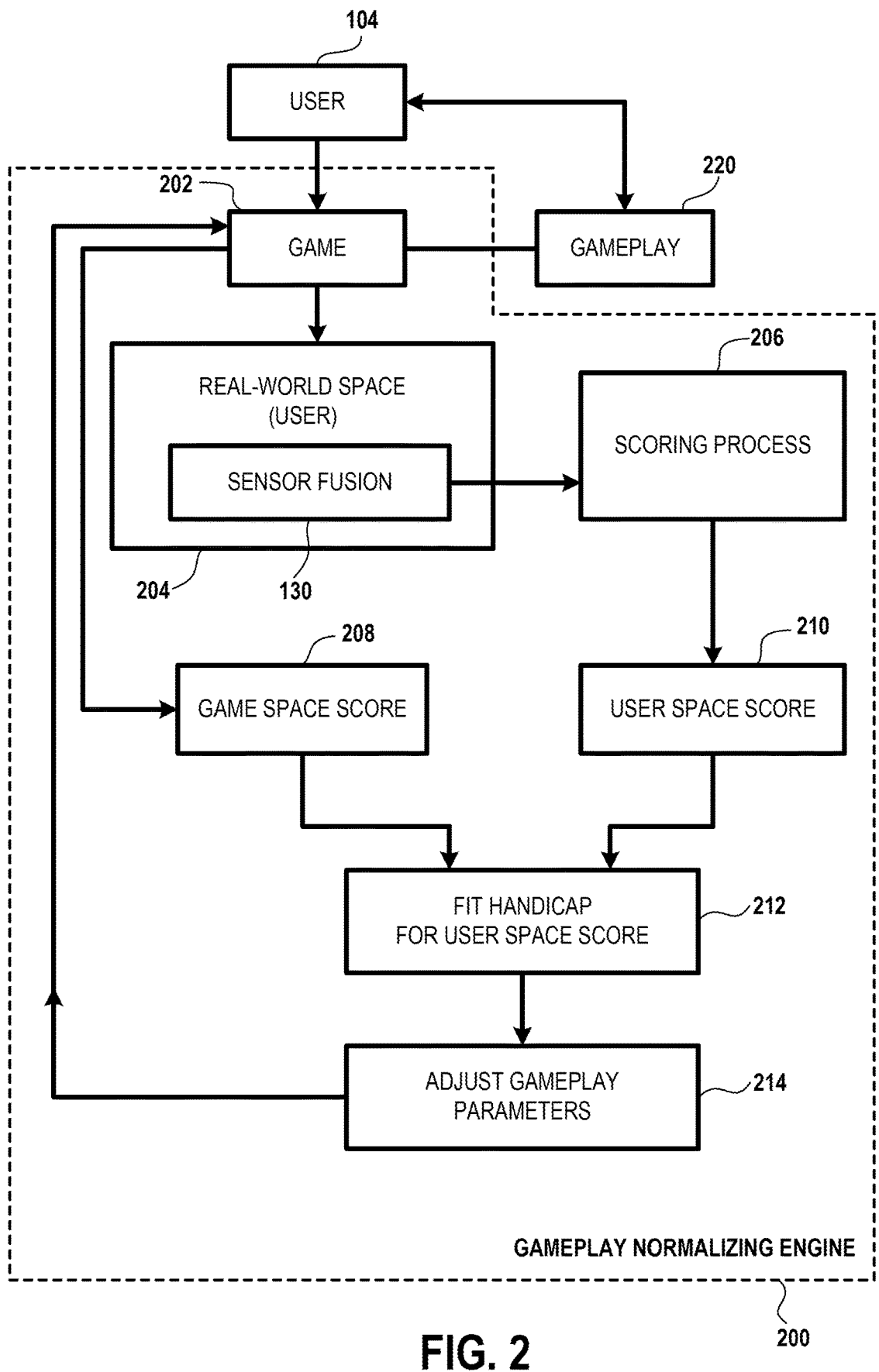
FIG. 2 illustrates an example of processing, which uses a gameplay normalization engine to adjust gameplay parameters of a game, in accordance with one embodiment.

FIG. 2 illustrates an example of processing, which uses a gameplay normalization engine 200 to adjust gameplay parameters of a game 202, in accordance with one embodiment. In one example, a user 104 may be playing a game 202 or starting to play the game 202. The normalizing engine 200 may be triggered (either by program or by user input) to perform scanning of the zone of interaction 102 before the game launches, so that the AR gaming experience will be pre-configured with adjusted gameplay parameters. In other embodiments, the user 104 may start to play the game and then after the game has started, the gameplay parameters may be adjusted either all at once or gradually over time to provide for a smooth transition.

In operation 204, the real-world space of the user represents the location where the user may be playing in AR game, and is referred to herein as a zone of interactivity 102. The zone of interactivity represents the area where the user may be interacting with an AR game or AR glasses 103, as described above. Sensors in the real-world space 100 may be utilized to scan the environment to generate an acoustic profile for that environment. The scanning can you sensor fusion 130, and utilize different sensors that may be present in the zone of interactivity 102, or that can be brought into the zone of interactivity 102 to perform an initial scan of the real-world space. In this manner, the scanning of the real-world space 100, and specifically the zone of interactivity 102, can be performed once or periodically and safe to storage for retrieval for later gameplay.

In this manner, it is not necessary to continuously perform the scanning each time the gameplay using the AR glasses 103 is performed. Using sensor fusion 130, a scoring process 206 is performed. The scoring process 206 is generally used to identify different types of objects in the real-world space 100 and associated surface materials for the different types of materials present in and around the zone of interactivity 102. As will be described below, a scoring process can include identifying the different types of materials for different types of objects present in the zone of interactivity 102. The scoring process can include identifying specific types of materials and determining if those types of materials are present in the zone of interactivity 102.

A threshold is used to determine whether those surfaces are present, or a sufficient amount of those surfaces are present in order to be counted in a numeric count. The numeric count will therefore be used to score the types of surfaces and associated acoustic absorption or reflection of those types of materials present in the zone of interactivity. The numeric score is a combined score of the different types of materials and surfaces, and associated quantities and absorption and reflectivity of those materials. Collectively, those values produce a vector that defined the different types of materials and weights associated to those materials in the real-world space.

The scoring process 206 will therefore produce a user space score 210. The user space score 210 represents the output of the scoring process 206. In one embodiment, each zone of interactivity 102 in which a user is utilizing AR glasses 103 will have its unique user space score 210. The game developer of the game 202 will also produce an optimized game space score 208, that represents the optimal or optimize baseline score for the type of environment in which the game may be played using AR glasses 103 or similar AR type glasses.

In one embodiment, the user space score can be modified or adjusted additionally using self-identified handicaps. These self-identified handicaps can be unique to a user and adjusted based on inputs, settings, or learned settings. By way of example and without limitation, the self-identified handicaps may include colorblindness, deafness, sensitivity to motion sickness, must be seated, non-mobile, motor skill degradation, sensitive to loud noises, hard to see in the dark, adverse to bright lights, or combinations of these and/or other self-identified handicaps or preferences. In one configuration, these self-identified handicaps are regarded as added accessibility options, which can be set using a user interface, voice input, controller input or via a touch screen.

A fit handicap 212 for that user space score 210 can be generated by comparing the game space score 208 to the user space score 210. The fit handicap 212 represents how close the user space score 210 is from the game space score 208, or how far apart the scores are to each other. The more deviation there is between the two will indicate that the zone of interactivity 102 is less suitable for playing the AR game because of the characteristics of the surfaces in the zone of interactivity 102. Consequently, a user 104 plane in AR game in the zone of interactivity 102 where the deviation is substantial will have a handicap relative to other users where the deviation is minimal.

In one embodiment, a deviation that is less than 10 percent is suitable and not very impactful to the user 104 when playing in AR game 202. A deviation that is less than 30 percent is still tolerable, but the user 104 will be playing at a disadvantage relative to other players that are playing with a smaller deviation. Deviations greater than 30 percent, for example, will see a greater handicap that may prevent the user 104 from advancing the game or will hinder the user relative to other users and playing the game.

In one embodiment, using the fit handicap 212 of the user 104, it is possible to make adjustments to gameplay parameters 214, to compensate for the deviation. By way of example, the gameplay parameters may be adjusted dynamically to make the game easier to score points, easier to interact with AR characters, easier to see AR characters, changing parameters of the AR characters to be more distinctive in the background, increasing the sound of the AR characters are objects based on the acoustics in the user space, making it easier to advance to other levels, or the like.

These parameters can be inputs to the game engine, which adjust the various difficulty, settings, and other parameters when playing with the fit handicap and adjusting for that fit handicap. In one embodiment, when one player is playing against another player in a multiplayer AR game, it is possible to adjust the gameplay parameters 214 of each of the players such that they are fit handicaps 212 are approximately equal. In this manner, is not required that the fit handicaps be completely eliminated, but simply by adjusting gameplay parameters of each of the respective game instances of the players it is possible to keep the players at approximate even or equal footing. This optimization of one or both of the players, or multiple players in a multiplayer game, one hands the experience of the AR game and gameplay, since one user or some users are not in more advantageous positions than others due to the characteristics of their respective real-world environments.

Figure 3:
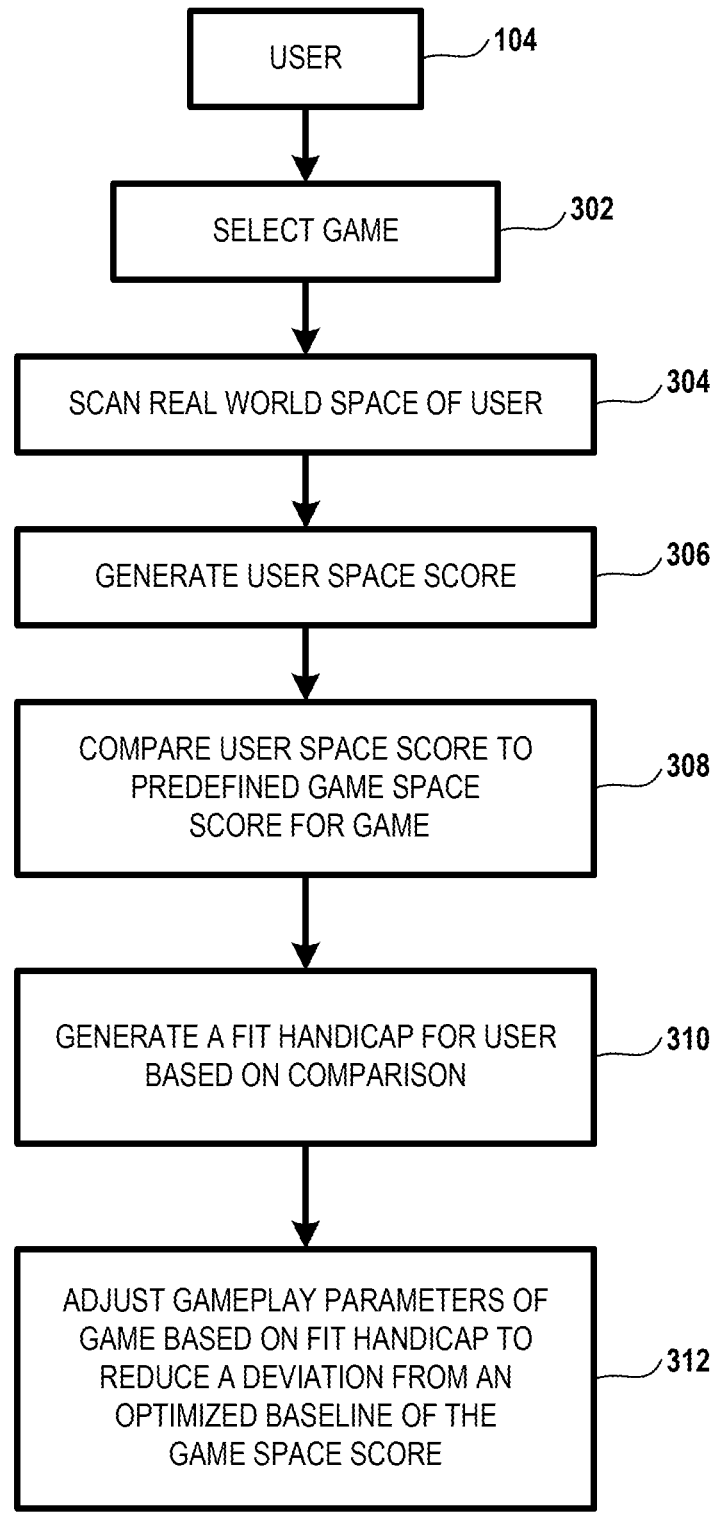
FIG. 3 illustrates one example embodiment where gameplay parameters may be adjusted based on a fit handicap of the user, in accordance with one embodiment.

FIG. 3 illustrates one example embodiment where gameplay parameters may be adjusted based on a fit handicap of the user, in accordance with one embodiment. In one embodiment, the user 104 will select a game 302. The game 302 will be an AR game that has been instrumented by a developer in order to be adjusted in various parameters, which may be predefined parameters for removing deviations in the handicap of the specific player or players. Once the game has been selected 302, the real-world space of the user can be scanned in operation 304. As mentioned above, the scanning can be performed by one or more sensors. In the simple example, sensors of the AR glasses themselves may be utilized. The sensors can include microphones, cameras, inertial sensors, ultrasonic sensors, or combinations of these or more sensors. In other embodiments, the sensors can include other sensors that are part of the environment in which the player or user will be playing the game 302.

As shown in FIG. 1, the sensors can be many, and the output of the sensors can be utilized in a sensor fusion 130 process in order to accurately scan and quantify the difference materials, surfaces, absorptions, reflectivity, and parameters of the real-world space of the user. Using the scanned parameters, which may be in the form of a vector, or a matrix, the data can then be utilized to generate a user space score 306. In one embodiment, the user space score can be a normalized value. In another embodiment, the user space score can be a plurality of values in the form of a vector, with associated weights and magnitudes of each of the different types of parameters that make up the score. In another embodiment, a matrix can identify different types of parameters defining the surfaces and materials of the space, and the magnitude or amount of those materials and surfaces relative to the position of the user in that real-world space, or the specific zone of interactivity 102.

In operation 308, the user space score is compared to predefined game space scores for the game. As mentioned above, the game space score is a score value or values that are signed by the developer or developers of the game. These values represent the optimum values of a space where the game can be played. For instance, if the AR game requires a lot of projection of images onto a wall, the amount of open wall space onto which projection is possible will increase the playability of the AR game. Other parameters associated with the space and their adaptability to the AR content to be projected or displayed is also taken into account. In operation 310, a fit handicap is generated for the user based on the comparison. As mentioned above, the fit handicap may identify a deviation from the optimal gain space score defined by the developer of the game.

In operation 312, gameplay parameters of the game can be adjusted based on the fit handicap. The adjustment, in one embodiment, will reduce a deviation from an optimized baseline for the game space score. In other embodiments, it may be desirable to increase the deviation of one player so that the deviation of the two players or multiple players are about equal. Accordingly, it should be understood that the deviation from the game space score can be tolerated in some cases, and in some cases can be increased so that multiple players in a multiplayer game can have an approximately equal footing when their deviations are approximately equal or substantially equal.

Figure 4:
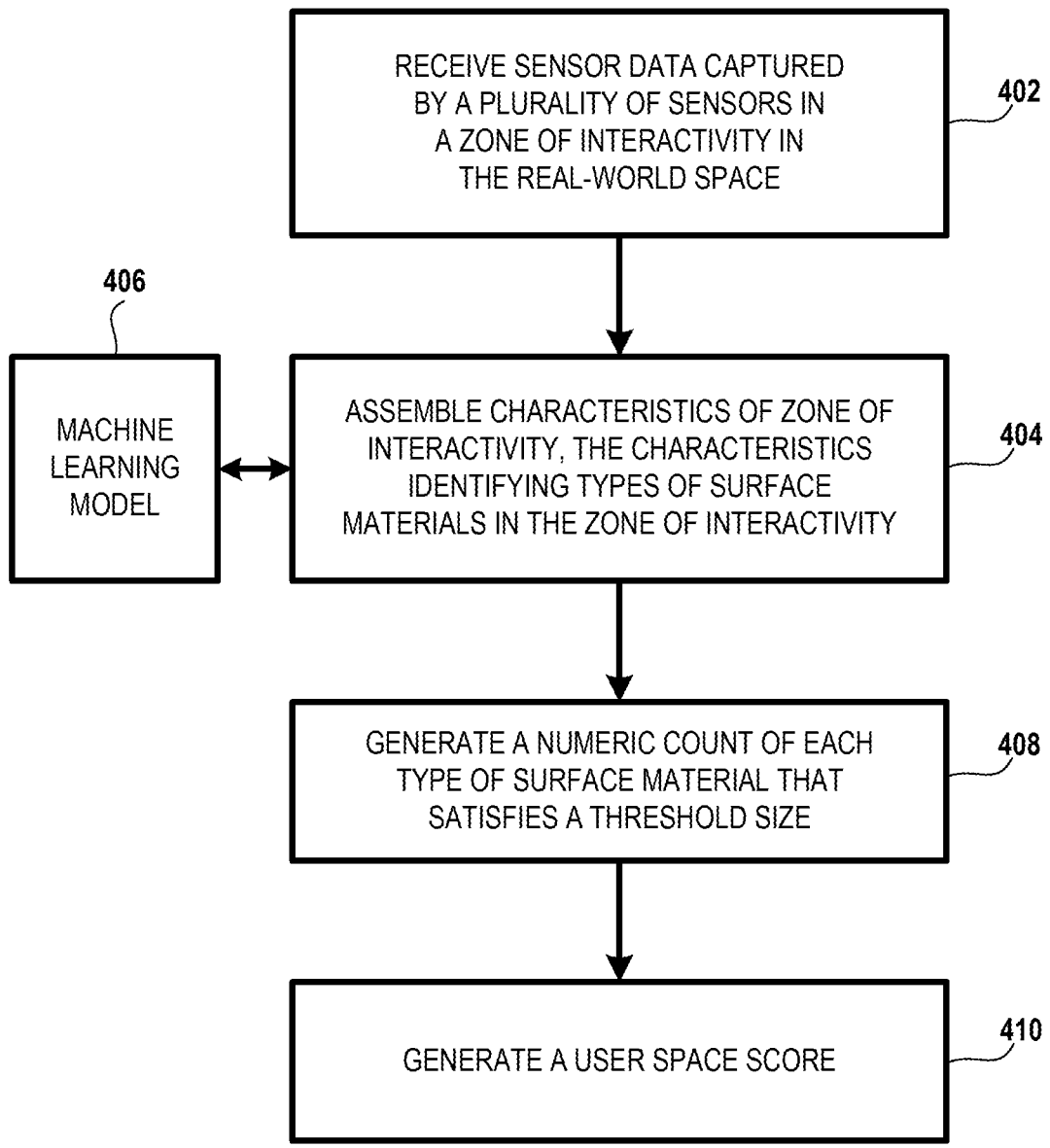
FIG. 4 illustrates a process for generating a user space score, in accordance with one embodiment.

FIG. 4 illustrates a process for generating a user space score, in accordance with one embodiment. As mentioned above, there are several ways of generating a user space score, and the following example should not limit the other ways mentioned above. In one embodiment, sensor data is captured by a plurality of sensors in the zone of interactivity in the real-world space in operation 402. As mentioned above, the sensor data can be captured utilizing different types of sensors, such as cameras, microphones, inertial sensors, ultrasonic sensors, temperature sensors, humidity sensors, and the like. The types of devices that can be utilized to capture these sensor data inputs can include AR glasses 103, and devices that may be present in the zone of interactivity 102 or the real-world space 100.

By way of example, these types of devices can include, in addition to the AR glasses 103, television sensors, cameras, game consoles, controllers utilized for a game, cell phones, watches, and other devices that may be present in and around the real-world space 100. In operation 404, characteristics of the zone of interactivity are assembled. The characteristics identify the different types of surface materials in the zone of interactivity and other objects that may be present or that define the real-world space. These objects can vary depending on what is present in the real-world space 100 of the user 104.

The example of FIG. 1 shows that various types of objects can be present in the zone of interactivity 102. It should be understood that different users will have different spaces and different objects will be present in their spaces that are customized to their tastes, desires, and decoration and arrangement choices. For this reason, the characteristics of the user space score will be unique to where the user decides to play the AR game and interact in their specific zone of interactivity. For this reason, the types of devices that defined the sensors and capture data in the form of sensor data for, e.g. sensor fusion 130, will vary greatly.

Nevertheless, sensor data is captured in order to scan and identify different types of objects that may be present in the space and the surface materials that defined those types of objects. In some embodiments, a numeric count is performed in order to identify the amount of objects and amount of surfaces of those objects and materials that satisfy a threshold size. By way of example, if a clean and open wall is present in the zone of interactivity 102, that clean and open wall may represent a value based on the amount of square footage, or square meters present for that type of material. Thus, for each type of material, different square footage or square meters can be calculated and a numeric value can be assigned to the quantity of that type of material or surface object in the space.

If the amount of surface material is too small to be counted, e.g. less than a square foot, then that material or object may not be counted since it does not meet the threshold. In some embodiments, material surfaces that exceed at least one square foot will be counted in order to identify a count of that type of material in the zone of interactivity 102. In some embodiments, a machine learning model 406 can be utilized in order to process raw sensor data to identify different types of materials and characteristics present in the zone of interactivity. By way of example, a machine learning model can receive image data that can be processed to identify features within each of the images and classify those features to identify objects present in the space.

For example, using machine learning, it is possible to identify actual features and characteristics present in an image captured by a camera. The features and characteristics can identify not only what the object is, but attributes of the object such as texture, reflectivity, roughness, positioning, lighting, and other distinguishable or identifiable characteristics. Accordingly, the machine learning model can also take in other inputs such as sound, lighting, microphone array, and other data useful for identifying characteristics of the different types of objects and surface materials. Utilizing this information and the numeric count produced in operation 408, a user space score is generated in operation 410.

FIG. 5 illustrates examples of different types of objects present in a real-world space, and attributes and characteristics identified in the real-world space responsive to the scanning described above. For a simple example, the real-world space or zone of interactivity 102 will include walls 420, floors 422, furniture 424, and other objects 426. The other objects are too many to describe here, but can include any type of object that may be present in a space. In some embodiments, other objects can also be people, pets, or other moving types of objects such as robots.

In the example illustrated, the walls 420 may be defined by different types of surface materials, which can be rough, brick, coverings, smooth, Windows, etc. If the threshold is satisfied for the amount of that material, a numeric count is assigned to that type of surface material. By way of example, if the amount of rough surface on a wall exceeds two square feet, the numeric count can be assigned at least a 2. If the smooth surfaces exceed at least 16 square feet, then the numeric count can be set to 16. The illustrated numbers are just provided to illustrate a counting method that accounts for the type of material and the quantity or amount present in the space.

The same can be done for the floors, the furniture, and other objects. The result is a user space score 450, for the zone of interactivity 102 of the user 104. The user space score can be defined as a vector, a matrix, or any other value or formula that can then be compared to the game space score defined for the game by the developer. As mentioned above, utilizing or knowing the user space score will enable adjustments to the gameplay parameters of the game in order to remove deviations or adjust for deviations relative to one or other players. The gameplay parameters, as mentioned above can also include adjusting of metadata that control one or more of difficulty settings or scoring thresholds when playing the game with a specific fit handicap.

It should be understood that making adjustments to the gameplay parameters will enable removing or adjusting the difficulty or other parameters of the game so that players can play the game at a substantially even footing. Thus, the scanning of the environment will produce a feature similarity between the real-world space of the user versus the features that would provide the more optimum or optimized baseline for the type of environment to be used when playing the game during the AR game. Enabling dynamic adjustment of the gameplay parameters will reduce handicaps between players and allow for more enjoyment of games that are taking into account the environment that is unique to each player when playing an AR game. The adjustment therefore provides a normalization or a ground truth between two players or multiple players, even though the players are playing in distinct real-world environments (e.g. in an online game or cloud game during streaming).

Figure 6:
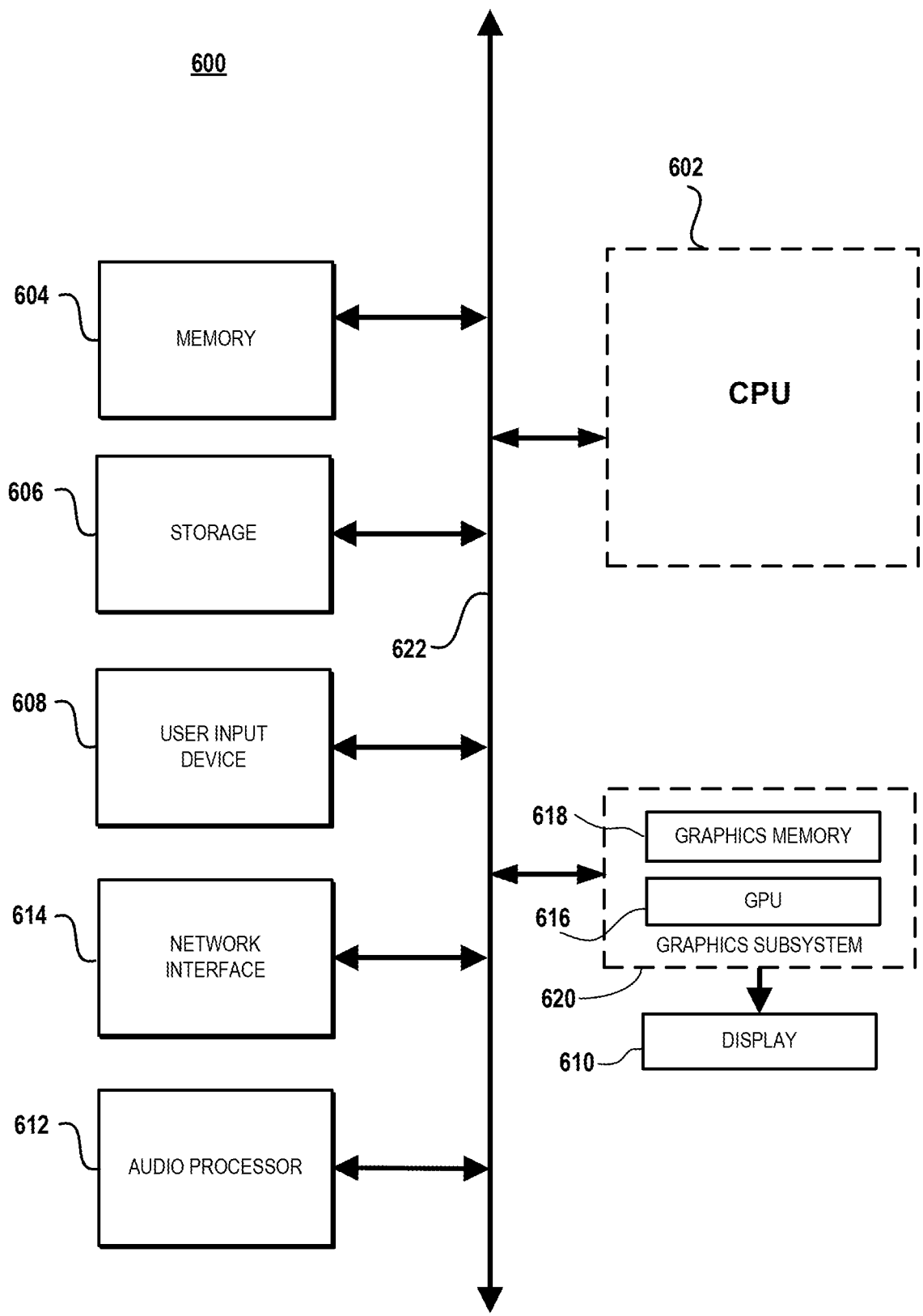
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games are played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the method/process operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for processing feature similarity for a real-world space used for augmented reality (AR) gameplay, the method comprising:
   receiving captured sensor data from the real-world space used by a user for said AR gameplay of a game, the sensor data providing data to identify characteristics of physical objects in the real-world space;
   generating a user space score using the characteristics of the physical objects identified in the real-world space; and
   comparing the user space score to a game space score that is predefined for the game, the comparing used to produce a fit handicap for the AR gameplay of the game in the real-world space by the user.

2. The method of claim 1, wherein said real-world space includes a zone of interactivity by the user during said AR gameplay, and said characteristics of the physical objects include types of surface material.

3. The method of claim 2, wherein the user space score includes a numeric count of each type of surface material within the zone of interactivity.

4. The method of claim 3, wherein each numeric count is scored upon meeting to threshold size for said type of surface material.

5. The method of claim 1, wherein the sensor data is captured by one or more of a camera, a microphone, or an ultrasonic sensor, and the sensor data, the sensor data is processed to identify feature sets that are labeled by a machine learning process, the machine learning process is trained to identify the characteristics of the physical objects in the real-world space.

6. The method of claim 1, wherein the game space score is correlated to interactive content developed for said game, the game space score defines an optimized baseline for a type of environment to be used for playing the game during said AR gameplay.

7. The method of claim 1, wherein the fit handicap for the AR gameplay of the game in the real-world space by the user identifies a deviation from an optimized baseline for a type of environment to be used for playing the game during said AR gameplay.

8. The method of claim 7, further comprising,
adjusting gameplay parameters for the user when playing the game to substantially eliminate the deviation from the optimized baseline, the adjusting is configured to adjust metadata that controls one or more difficulty settings or scoring thresholds when playing with the fit handicap.

9. The method of claim 8, wherein substantially eliminating the deviation functions so place the user at about equal footing with another user that plays the game with a game space score that is approximately at the optimized baseline.

10. The method of claim 8, wherein each of the user and another user each have their gameplay parameters dynamically adjusted when playing the game to substantially eliminate the deviation from the optimized baseline, such that each of the user and the another user play the game at about equal footing with one another.

11. A method for processing feature similarity for a real-world space used for augmented reality (AR) gameplay, the method comprising:
receiving captured sensor data from the real-world space used by a user for said AR gameplay of a game, the sensor data providing data to identify characteristics of physical objects in the real-world space;
generating a user space score using the characteristics of the physical objects identified in the real-world space;
generating a fit handicap for the AR gameplay of the game in the real-world space by the user; and
adjusting gameplay parameters of the game for the user, the adjusting causing changes to difficulty settings for the game to compensate for the fit handicap.

12. The method of claim 11, wherein the fit handicap is based on a comparison of the user space score to a game space score that defines an optimized baseline for a type of environment to be used for playing the game during said AR gameplay.

13. The method of claim 12, further comprising,
adjusting scoring thresholds for the game, the adjusting of scoring thresholds lowers or increases a skill requirement for actions in the game to be awarded scoring in the game.

14. The method of claim 11, wherein adjusting gameplay parameters of the game for the user functions to reduce a deviation of the user in the real-world space to a game space score that is approximately at an optimized baseline for a type of environment to be used for playing the game during said AR gameplay.

15. The method of claim 11, wherein reducing the deviation functions so as to place the user at about equal footing with another user that plays the game with a game space score that is approximately at the optimized baseline.

16. The method of claim 11, further comprising,
adjusting gameplay parameters of the game for another user to place the another user at about a similar fit handicap as the fit handicap of the user.

17. The method of claim 11, wherein said real-world space includes a zone of interactivity by the user during said AR gameplay, and said characteristics of the physical objects include types of surface material.

18. The method of claim 17, wherein the user space score includes a numeric count of each type of surface material within the zone of interactivity.

19. The method of claim 18, wherein each numeric count is scored upon meeting to threshold size for said type of surface material.

20. The method of claim 11, wherein the sensor data is captured by one or more of a camera, a microphone, or an ultrasonic sensor, and the sensor data, the sensor data is processed to identify feature sets that are labeled by a machine learning process, the machine learning process is trained to identify the characteristics of the physical objects in the real-world space.

\* \* \* \* \*